United States Patent [19]

Krause

[11] Patent Number: 5,587,832
[45] Date of Patent: Dec. 24, 1996

[54] SPATIALLY LIGHT MODULATED CONFOCAL MICROSCOPE AND METHOD

[75] Inventor: Andrew W. Krause, Sparks, Md.

[73] Assignee: Biophysica Technologies, Inc., Sparks, Md.

[21] Appl. No.: 138,067

[22] Filed: Oct. 20, 1993

[51] Int. Cl.⁶ ................................. G02B 21/06
[52] U.S. Cl. ................... 359/385; 359/389; 250/216
[58] Field of Search .................... 359/368, 385, 359/386, 387–389; 250/201.3, 202, 227.26, 229, 230, 216, 227.2, 566, 571, 208.1; 362/321, 348

[56] References Cited

U.S. PATENT DOCUMENTS

| | | | |
|---|---|---|---|
| 3,013,467 | 12/1961 | Minsky | 356/432 |
| 3,926,500 | 12/1975 | Frosch et al. | 359/235 |
| 4,198,571 | 4/1980 | Sheppard | 250/571 |
| 4,561,731 | 12/1985 | Kley | 359/36 |
| 4,601,537 | 7/1986 | Saccocio | 359/117 |
| 4,634,880 | 1/1987 | Lindow et al. | 250/566 |
| 4,699,498 | 10/1987 | Naemura et al. | 346/160 |
| 4,802,748 | 2/1989 | McCarthy et al. | 359/368 |
| 4,863,226 | 9/1989 | Houpt et al. | 359/212 |
| 5,032,720 | 7/1991 | White | 250/236 |
| 5,035,476 | 7/1991 | Ellis et al. | 359/202 |
| 5,065,008 | 11/1991 | Hakamata et al. | 359/385 |
| 5,067,805 | 11/1991 | Corle et al. | 359/235 |
| 5,081,349 | 1/1992 | Iwasaki | 359/368 |
| 5,099,363 | 3/1992 | Lichtman | 359/368 |
| 5,122,653 | 6/1992 | Ohki | 250/216 |
| 5,132,526 | 7/1992 | Iwasaki | 250/201.3 |
| 5,138,459 | 8/1992 | Roberts et al. | 358/209 |
| 5,144,477 | 9/1992 | White | 359/368 |
| 5,162,941 | 11/1992 | Favro et al. | 359/368 |
| 5,239,178 | 8/1993 | Derndinger et al. | 359/397 |
| 5,260,826 | 11/1993 | Wu | 359/368 |

OTHER PUBLICATIONS

J. B. Sampsell, "An Overview of Texas Instruments Digital Micromirror Device (DMD) and its Application to Projection Displays," Texas Instruments, Inc., Dallas, TX.

Eric R. Fossum, "Active–pixel Sensors Challenge CCDs", Laser Focus World, Jun. 1993.

*Primary Examiner*—James Phan
*Attorney, Agent, or Firm*—Sixbey, Friedman, Leedom & Ferguson

[57] ABSTRACT

The confocal imaging system and method involve the imaging of a specimen under observation by projecting a light pattern of illumination spots simultaneously on the specimen. This is accomplished by a pattern array unit which transforms light from a light source into a desired pattern of illumination spots. Light detected from the specimen is confined to a pattern conforming to the pattern of the illumination spots by a detector masking unit which rejects light beyond the pattern. Image signals are created from the received light and stored, and the stored image signals are combined to form a complete image frame.

22 Claims, 3 Drawing Sheets

FIG. 1
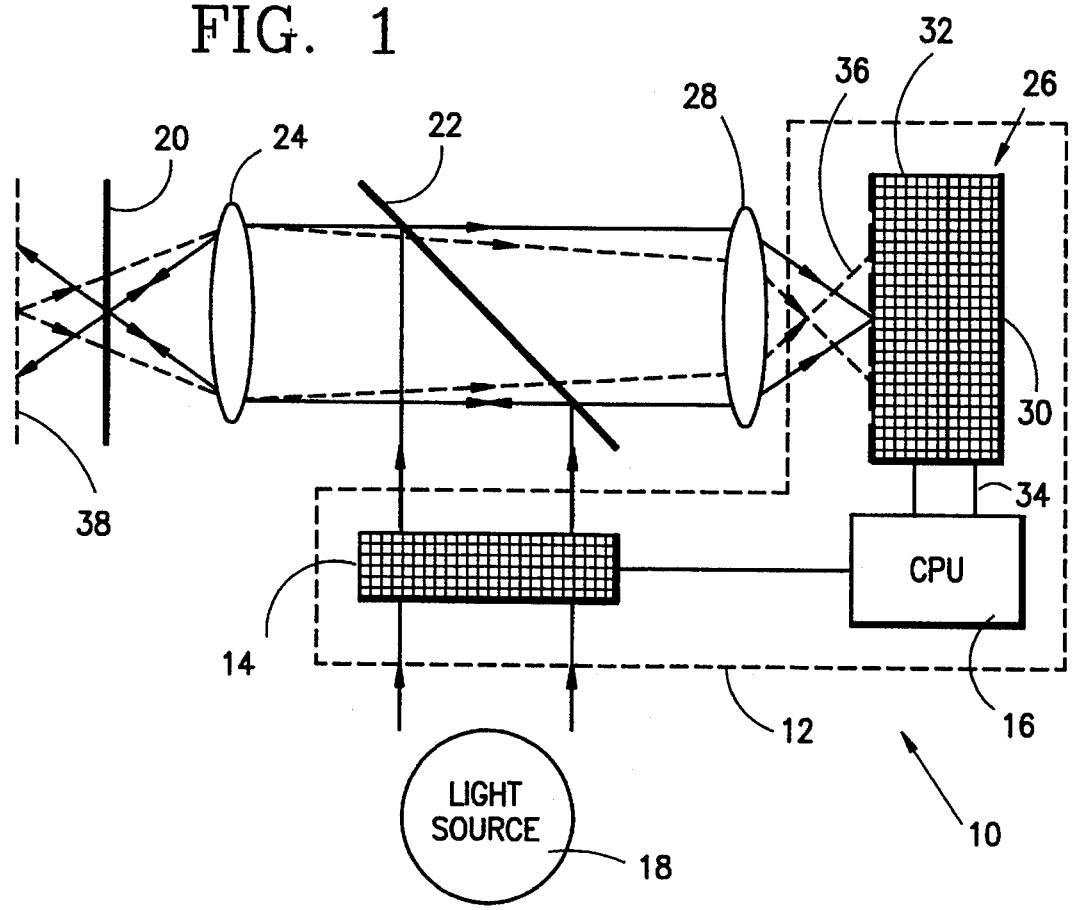
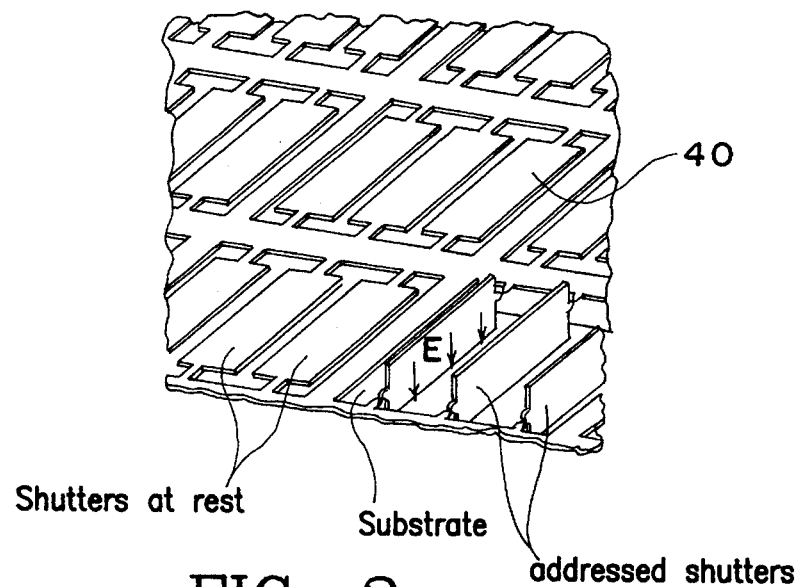
Shutters at rest   Substrate   addressed shutters
FIG. 2

SPATIALLY LIGHT MODULATED CONFOCAL MICROSCOPE AND METHOD

TECHNICAL FIELD

This invention relates generally to confocal microscopes and more particularly to a spatially light modulated confocal microscope and method which employs multiple pattern illumination.

BACKGROUND ART

The basic principle that distinguishes confocal microscopy from other forms of light microscopy is that discrete aperture spots are illuminated in the object plane of the microscope from which reflected or fluorescent light is then relayed for observation through conjugate apertures in the image plane. For diffraction limited spots, this principle results in spacial resolution 1.32 times better than the optimum resolution obtainable by conventional light microscopy. Furthermore, this method dramatically reduces the interference of stray, out-of-focus light from an observed specimen above or below the focal plane. This technique actually permits optical sectioning of living tissue (with depth restrictions) and high-resolution 3-D reconstruction with automated focussing controls. It is the only microscopic technique that can effectively resolve individual cells in living tissue without staining.

Presently known confocal microscopes employ a sequential scanning technique which involves scanning each illumination and image conjugate aperture pair one at a time until the object (and image) has been covered sufficiently to produce an adequate confocal image. A basic form of the confocal microscope is disclosed in U.S. Pat. No. 3,013,467 to Minsky.

Scanning technologies which have been developed for known confocal microscopes include a mechanical translation of the specimen with fixed optics, but scanning has also been accomplished using a fixed specimen and scanning beams manipulated by special rotating aperture disks. The use of such rotating disks is disclosed in U.S. Pat. Nos. 4,802,748 to McCarthy et al., 5,067,805 to Corle et al., 5,099,363 to Lichtman and 5,162,941 to Favro et al. Although these disks include a plurality of apertures, only one aperture at a time is used for scanning. Other known confocal scanning systems have included a laser beam rastered with rotating mirrors to scan a specimen, or a laser beam which scans a slit rather than a spot. Such slit scanning increases imaging speed but slightly degrades resolution.

Conventional confocal microscopes are subject to a number of limitations imposed by the scanning techniques employed. In some cases, confocal image acquisition is too slow for certain applications and becomes slower as the scan line density increases and as aperture separation decreases. Furthermore, these parameters are preset and are not practically adjustable in most commercial systems. Signal-to-noise ratio (SNR) must be severely sacrificed to increase imaging rate. Trying to improve SNR by increasing illumination intensity is often limited by the susceptibility of live cells to photodamage or rapid fluorophore photobleaching.

For most conventional confocal systems, proper alignment is critical and may be difficult to maintain. The same physical aperture must be used for illumination and detection thereby limiting this technique to the study of reflection and epifluorescence. Therefore, transmitted light confocal imaging through a translucent slice (as for many voltage-sensitive dyes) is not practically possible.

Finally, it is often difficult or impossible for the user to restrict illumination and imaging to any selected subfield and differentially control light exposure.

Laser scanning systems have become widely accepted because of their higher intensity and diffraction limited spot size which results in greater resolution in the confocal image. However, they are more expensive than white-light systems and do not offer the selection of illumination wavelengths needed for the growing varieties of fluorescence indicators now available. Furthermore, laser intensity often leads to problems with phytotoxicity and rapid photobleaching.

DISCLOSURE OF THE INVENTION

It is a primary object of the present invention to provide a novel and improved spatially light modulated confocal microscope which employs multiple pattern illumination to provide conjugate aperture patterns in the image plane.

Another object of the present invention is to provide a novel and improved method for confocal microscopy which includes creating complementary patterns of illumination spots and imaging these spots on a specimen.

A further object of the present invention is to provide a novel and improved method for confocal microscopy which includes creating a plurality of complementary patterns of illumination spots and superimposing these patterns sequentially on a specimen.

Yet another object of the present invention is to provide a novel and improved confocal light modulation system which can be conveniently combined with almost any conventional research microscope to convert the research microscope to a confocal microscope having unique capabilities.

A further object of the present invention is to provide a novel and improved spatially light modulated confocal microscope designed to image illuminate selected subsets of an entire cell field thereby enhancing image rate, signal-to-noise ratio, and light collection. The device will include user selectable program modules so that a user can fully control the optical transfer function of the confocal microscope in coordination with particular optical characteristics of a specimen.

Still another object of the present invention is to provide a novel and improved spatially light modulated confocal microscope wherein selected image subsets and entire field-by-field image acquisition can be completely controlled by an image processing system.

Yet another object of the present invention is to provide a novel and improved spatially light modulated confocal microscope which provides external gating and control of illumination and image acquisition giving the user the selection of illumination and imaging from partial view fields. White light, other non-coherent light sources or laser illumination may be selected and variable speed imaging is provided. Also, a choice may be made of reflection, fluorescence or transmission confocal imaging.

A further object of the present invention is to provide a novel and improved spatially light modulated confocal microscope which provides confocal illumination and imaging from user selected subsets of an object-plane down to the level of single-spaced confocal measurements.

Another object of the present invention is to provide a novel and improved spatially light modulated confocal microscope adapted for software-mediated tuning of the microscope optical transfer function to optical specimen characteristics to provide novel forms of contrast enhancement.

A further object of the present invention is to provide a novel and improved spatially light modulated confocal microscope with no moving parts to create vibration which employs advanced analog or digital spatial light modulators to provide user-selectable imaging rates faster than one thousand frames per second while maintaining a sufficient signal to noise ratio for high quality imaging.

A still further object of the present invention is to provide a novel and improved spatially light modulated confocal microscope wherein collimated light is patterned through a pixel shutter array having a high pixel density with patterned gating ability to achieve multiple pattern illumination of a specimen. Detection is accomplished with a 2-D detector and conjugate image masking.

BRIEF DESCRIPTION OF THE DRAWINGS

FIG. 1 is a basic optical schematic of a spatially light modulated confocal microscope embodying the present invention;

FIG. 2 is a perspective view of a portion of an electrostatic shutter array for use with the confocal microscope of FIG. 1;

BEST MODE FOR CARRYING OUT THE INVENTION

Figure 3:
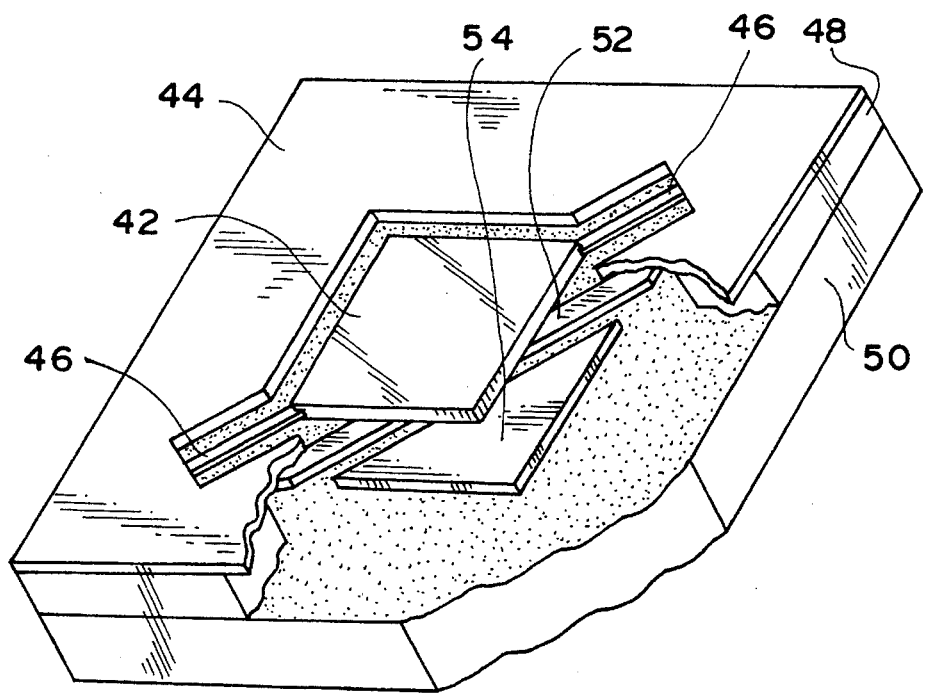
FIG. 3 is a cutaway view of a single pixel for a digital mirror device array used for the present invention.

Ordinary light microscopes are often not adequate for the examination of biological specimens which are generally three-dimensional. Therefore, confocal microscopy was developed where the specimen is illuminated in a very small area one point at a time and a detector receives light only from the illuminated point. The image of the whole sample is obtained by scanning point to point over the sample and then reconstructing the total image.

Referring now to FIG. 1, the spatially light modulated confocal microscope of the present invention indicated generally at 10 is schematically illustrated. In this device, the sequential spot scanning of conventional confocal microscopes is replaced by multiple pattern illumination (MPI), and the single channel detector, usually a photomultiplier tube, used with conventional sequential spot scanning is replaced by a two dimensional detector array masked by a conjugate aperture pattern which conforms with the multiple pattern illumination. Sequential complimentary patterns of illumination spots are imaged on an object.

A confocal light modulation system 12, which forms the basic component of the spatially modulated confocal microscope 10, may be combined with the basic optics present in most conventional research microscopes to convert the research microscope to a confocal microscope. This confocal light modulation system includes a multiple pattern aperture array 14 which operates under the control of a central processor unit 16 to transform illuminated light from a light source 18 into sequential complimentary patterns of illumination spots which are imaged on a specimen 20 by means of a dichroic beam splitter 22 and a microscope objective lens 24. In the image plane, a conjugate array detector system 26 detects the light from the illuminated spots on the specimen which are transmitted via the beam splitter 22 and a lens 28. This array detector system includes a two-dimensional detector 30 which is masked by a conjugate aperture pattern unit 32 controlled by the central processor 16. The conjugate aperture pattern unit can be a separate unit or can constitute an addressed masking section of the detector 30. Under the control of the central processor, the conjugate aperture pattern unit masks the detector to define a conjugate aperture image corresponding to the pattern of the illuminated spots on the specimen onto the detector 30 in synchrony with the corresponding complimentary pattern formed by the multiple pattern aperture array 14. Both the conjugate aperture pattern unit and the multiple pattern aperture array are preferably high speed, pixelated arrays having a high pixel density which provide patterns of very small spots.

The detector provides a video image output over lines 34 to the central processor unit which provides video image processing and display, or the detector could provide an output to a conventional video image processing and display system of known type.

To elaborate further, using the method and apparatus of the present invention, sequential complimentary patterns of illumination spots are imaged on the specimen 20. Each full complimentary set of patterns will illuminate an entire object field without voids. The corresponding conjugate aperture patterns formed in front of a two dimensional detector modulate the image and reject stray out-of-focus light indicated in broken lines at 36, in FIG. 1 from out-of-focus planes indicated by plane 38. This process can yield one complete image of the entire object field alter the storage and subsequent summing of the conjugate aperture patterns imaged on the detector 30.

The multiple pattern aperture array 14 can take two forms; namely, interference patterns or patterned throughput from an aperture pattern. Interference patterns are complex and difficult to control, and interference pattern integrity will be compromised by the differences in refraction and birefringence across specimens of living tissue. Therefore, a multiple pattern aperture array 14 which provides direct aperture throughput is preferred for its simplicity, versatility and ease of implementation. Such a multiple pattern aperture array can be formed by an array of ferroelectric liquid crystal devices, by a digital mirror device, or by electrostatic microshutters of the type illustrated at 40 in FIG. 2. At rest, the microshutters block light from the light source 18, but when selected shutters are gated from the central processor 16, they open as illustrated at E in FIG. 2 and pass light through to the specimen 20. Electronically addressed and gated microshutter arrays of the type shown in FIG. 2 are well known and have previously been employed in display devices. (See R. Vuelleumier, A-E Perret, F. Jurrez and P. Weiss (1984), Novel electromechanical microshutter display device. Proc. Eurodisplay '84, Display Research Conference Sept. SID).

Confocal imaging is possible by using two separate throughput aperture arrays operated in synchrony for the multiple pattern aperture array 14 and the conjugate aperture pattern unit 32. However, this requires extremely careful optical alignment and timing to implement. A simpler alternative is to employ an optical configuration that avoids use of two synchronously timed aperture arrays. This could be achieved by passing the image from the specimen back to the detector through the same aperture array used to form the multiple pattern aperture array 14, thus using this single array in place of the conjugate aperture pattern unit 32. For this purpose, the multiple pattern aperture array 14 would be positioned between the beam splitter 22 and the lens 24 in FIG. 1. However, this alternative requires precise optical alignment and would not provide a unit which could be easily attached to most conventional research microscopes.

The conjugate aperture pattern unit 32 and detector 30 may be advantageously formed electronically by a CID camera or a charge-coupled device detector array (CCD) which uses computer aided image processing to enable the detector to disregard light returns from detector pixels which are not activated. A charge-coupled detector has the ability to acquire an entire image at once rather than by raster scanning. A complete bit map must be constructed of where active pixels are located on the CCD after calibration for each aperture pattern to be provided by the multiple pattern aperture array 14 under the control of the central processing unit 16. Calibration simply requires training the processing unit 16 which controls the CCD to disregard pixels which should not be read by placement of a mirror in the objective focal plane of the microscope so that each illumination pattern from the multiple pattern aperture array can be imaged directly on the CCD and stored by the central processing unit. Additional electronic and computer aided filtering after calibration may be required to clarify aperture boundaries and improve spatial resolution and sectioning capability, but once this is done, only light transmitted to the CCD for an associated pattern from the multiple pattern aperture array 14 is imaged, while light spillage to other areas of the CCD is ignored and effectively masked. This technique provides practical transmission confocal microscopy because the illumination subsystem does not use the same optical path as the imaging subsystem as is evident from FIG. 1.

For a CCD unit to work at the high speeds desired for confocal microscopy, the detector pixel registers for the CCD device must be read rapidly in parallel for all lines. Therefore, special CCD pixel driver circuitry is required to optimize the detector for high speed applications.

The need for the special driver circuitry required with a CCD detector to read lines in parallel can be eliminated by forming the detector 30 from an active pixel sensor (APS) rather than from a CCD. The active pixel sensor operates in a manner similar to that of a random access memory with each pixel containing its own selection and readout transistors. These transistors are monolithically integrated in the pixel for readout selection and amplifying or buffering the pixel output signal. An APS pixel pattern selected by the central processor 16 receives the light pattern from the specimen 20 and a photogenerated charge is integrated in each active pixel under a photogate. The selected pixels can be addressed simultaneously to provide output signals to an image processing system or to the central processing unit 16 for image processing.

The multiple pattern aperture array 14 and, for some applications, the conjugate aperture pattern unit 32 may preferably be formed by a digital mirror device which includes a monolithic electrostatic, mirror-coated shutter array. These pixelated, micromechanical spatial light modulators are formed monolithically upon a silicon chip and include minor squares of highly reflective material suspended above the surface of silicon addressing circuitry by support pillar torsion bars. The addressing circuitry under each mirror pixel is a memory cell accessed by the central processor unit 16 which drives two electrodes under each mirror with complimentary signals. When a high logical level is applied to one of the electrodes, the mirror pixel rotates in a given direction with a total deflection of about 20° between mirror states, 10° on either side of the perpendicular to the silicon wafer.

Figure 4:
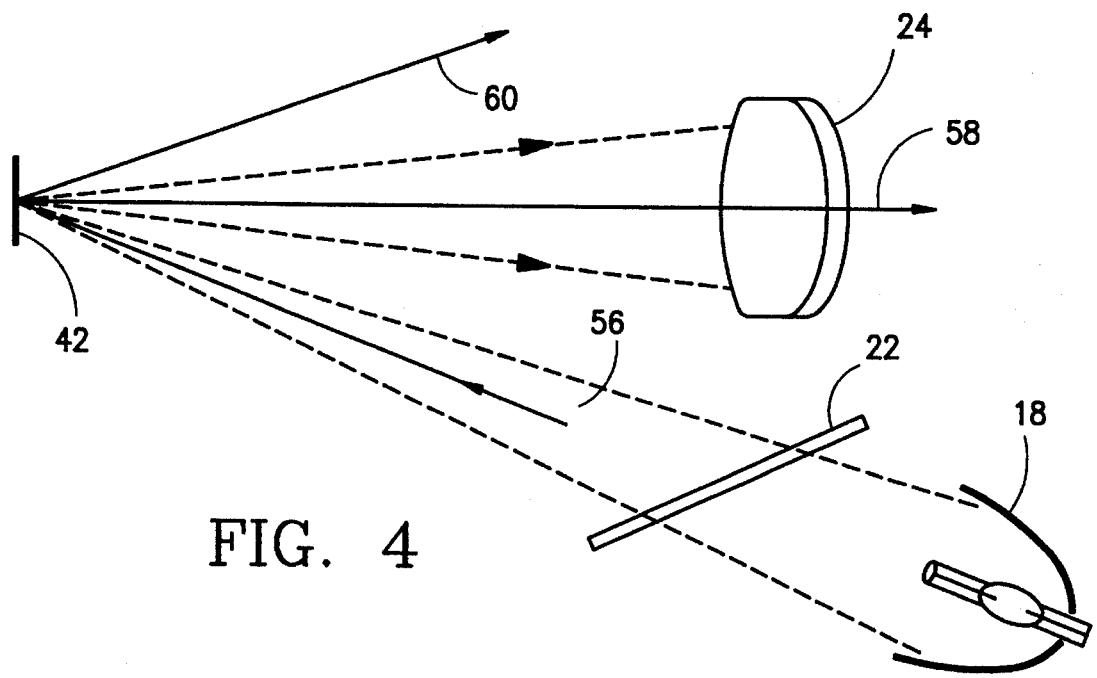
FIG. 4 is an optical diagram illustrating the operation of a digital mirror device with the present invention.

FIG. 3 illustrates the basic structure of one pixel for a digital mirror device array. Here, a mirror coated shutter 42 is mounted in contact with a conducting support layer 44 by torsion hinges 46. A spacer layer 48 separates the support layer 44 from a silicon chip 50. Each pixel of the digital mirror device array includes an address electrode 52 and a control or landing electrode 54 which, when activated, deflects the mirror coated shutter 42 around the torsion hinges 46. When the mirror coated shutter 42 forms part of a multiple pattern aperture array mounted in the optical path of the illumination subsection 56 for a microscope, it may be positioned in a first position as shown in FIG. 4 to direct a pixel of light along an optical path 58 to a specimen under observation. However, when the mirror coated shutter 42 is deflected from the position of FIG. 4, the pixel of light is angled away from the specimen along an optical path 60.

Software for the central processor unit 16 will enable a pre-programmed selection of any possible two dimensional pixel pattern within predetermined limits for confocal imaging. This technology provides the user with the flexibility to choose the pattern which offers the best combination of temporal and spacial resolution for a given application. The ability to custom make patterns can be geared for the correction of field distortion. The individual complementary images formed from each pixel pattern received by the detector 30 will be stored in the central processor unit 16 and subsequently overlaid to form one complete image frame for real-time imaging.

The control software for the central processor 16 will be programmed to select stored aperture patterns designated by the user and, for some applications, to automatically select stored aperture patterns in response to sensed conditions such as the optical characteristics of a specimen. The processor software may also cause the processor to make a specimen-dependent background correction for each image frame. This is accomplished by sensing with the detector 30 a background image which may result with all illumination pixels of the multiple pattern aperture array 14 closed to block light from the light source 18, and then correcting in the processor the subsequent individual complimentary images formed from each pixel pattern by subtracting therefrom the effect created by the background image.

Figure 5:
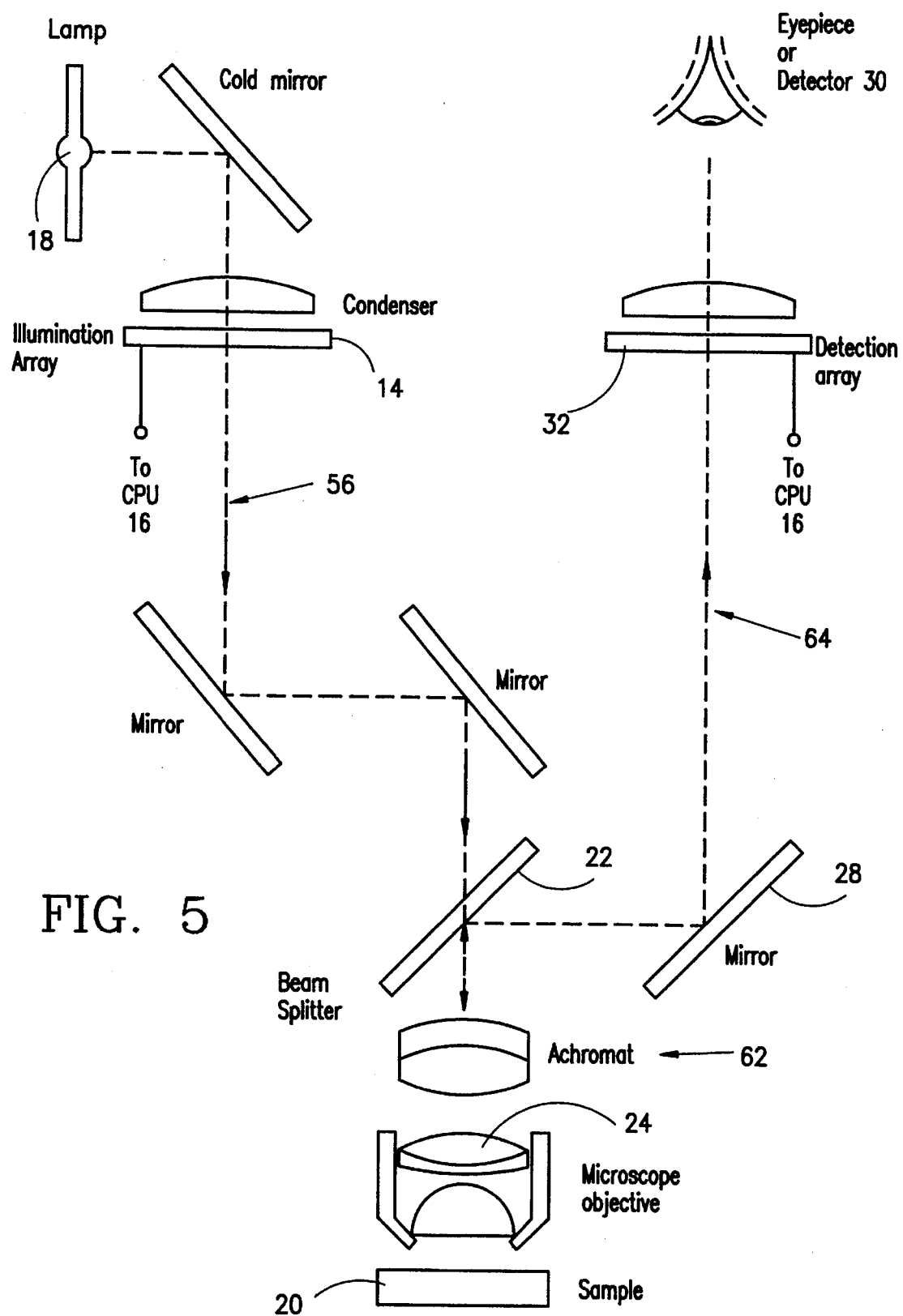
FIG. 5 is an optical diagram showing the combination of the confocal light modulation system of FIG. 1 with a research microscope.

FIG. 5 illustrates one manner in which the confocal modulation system 12 may be incorporated into the structure of a conventional research microscope 62. The multiple pattern aperture array 14 is inserted into the optical path of the illumination subsystem 56 for the microscope while the conjugate aperture pattern unit 32 is inserted into the optical path of the microscope image subsection 64. The remaining optical components shown in FIG. 5 are components of the research microscope 62.

Industrial Applicability

The spatially light modulated confocal microscope and method of the present invention provides conjugate aperture image formation to counter the deficiencies of scanning confocal microscopes. The confocal light modulation system may be used to convert a conventional research microscope into a confocal microscope having enhanced capabilities. Since the unit has no moving parts and is vibration free, it is suitable for sensitive micromanipulation and intracellular recording techniques common in neurophysiological studies. The high speed imaging capability of the unit renders it suitable for use to follow dendritic and synaptic changes in neurons on the millisecond scale or to measure kinetics in response to drugs or fluorescent indicators for intracellular pH, calcium, sodium, etc. The spatially light modulated confocal microscope is particularly well adapted for use in the high speed inspection of silicon wafers for quality control purposes in integrated circuit production.

What is claimed is:

1. A confocal optical imaging system for imaging a specimen comprising:

a light source for providing light to the specimen, first optical means to direct light from said light source along an illumination path to said specimen, pattern array means positioned in said illumination path between said light source and said specimen which operates to transform light from said light source into a plurality of simultaneously formed illumination spots arranged in a pattern, said pattern array means including an electronically addressed and gated electrostatic microshutter array operative in response to control signals to provide sequential patterns of illumination spots, and a control means connected to said pattern array means, said control means operating to provide control signals to said pattern array means to cause said pattern array means to provide sequential complimentary patterns of illumination spots, said first optical means operating to separately image each said pattern of illumination spots simultaneously on said specimen.

2. A confocal optical imaging system for imaging a specimen comprising;

a light source for providing light to the specimen, first optical means to direct light from said light source along an illumination path to said specimen, pattern array means positioned in said illumination path between said light source and said specimen which operates to transform light from said light source into a plurality of simultaneously formed illumination spots arranged in a pattern, said pattern array means including a digital mirror device having a mirror coated shutter array operative in response to control signals to provide sequential patterns of illumination spots, and a control means connected to said pattern array means, said control means operating to provide control signals to said pattern array means to cause said pattern array means to provide sequential complimentary patterns of illumination spots, said first optical means operating to separately image each said pattern of illumination spots simultaneously on said specimen.

3. The confocal optical imaging system of claim 2 wherein said mirror coated shutter array includes a plurality of mirror coated shutters each forming and controlling an individual pixel of light from said light source wherein each said individual shutter can be switched between a first and a second state to either block or transmit a single pixel of light.

4. A confocal optical imaging system for imaging a specimen comprising:

a light source for providing light to the specimen, first optical means to direct light from said light source along an illumination path to said specimen, pattern array means positioned in said illumination path between said light source and said specimen which operates to transform light from said light source into a plurality of simultaneously formed illumination spots arranged in a pattern, said first optical means operating to image said pattern of illumination spots simultaneously on said specimen, image detector means operative in response to light to provide output signals, second optical means operating to direct light reflected from said pattern of illumination spots on said specimen along an imaging path to said image detector means, and means operating to mask said image detector means in synchrony with a pattern of illumination spots formed by said pattern array means to cause said image detector means to receive a light image in a pattern corresponding to the pattern of illumination spots and to reject light outside said pattern.

5. The confocal optical imaging system of claim 4 wherein said pattern array means is operative in response to pattern control signals to provide sequential patterns of illumination spots and said means to mask said image detector means is operative in response to masking control signals to mask said image detector in synchrony with the patterns of illumination spots to receive light in corresponding patterns, and control means is provided which is connected to said pattern array means and to said means to mask said image detector means, said control means operating to provide pattern control signals to said pattern array means and masking control signals to said means to mask said image detector means.

6. The confocal optical imaging system of claim 5 wherein said image detector means provides image output signals from each pattern of light received by said image detector means, said control means including storage means to receive and store said image output signals.

7. The confocal optical imaging system of claim 5 which includes image processing means, said image detector means operating to provide image output signals from each pattern of light received by said image detector means to said image processing means, said image processing means operating to store said image output signals from sequential patterns of illumination spots and to subsequently combine a plurality of said stored image output signals to form a complete image frame.

8. The confocal optical imaging system of claim 5 wherein said image detector means includes a charge coupled detector device.

9. The confocal optical imaging system of claim 5 wherein said pattern array means includes a digital mirror device having a mirror coated shutter array.

10. The confocal optical imaging system of claim 9 wherein said means for masking said image detector means includes a digital mirror device having a mirror coated shutter array.

11. The confocal optical imaging system of claim 5 wherein said pattern array means includes an electronically addressed and gated electrostatic microshutter array.

12. The confocal optical imaging system of claim 11 wherein said means for masking said image detector means includes an electronically addressed and gated electrostatic microshutter array.

13. A confocal light modulation system for insertion into the optical path of a microscope having an illumination optical path for providing light from a light source to a specimen under observation and an image optical path for providing an image of the specimen for observation, comprising:

pattern array means for insertion into said illumination optical path, said pattern array means operating to transform light from said light source into a plurality of simultaneously formed illumination spots arranged in a pattern, image detector means for insertion into said image optical path and means to mask said image detector means in synchrony with a pattern of illumination spots formed by said pattern array means to cause said image detector means to receive a light image in a pattern corresponding to the pattern of illumination spots.

14. The confocal optical imaging system of claim 13 wherein said pattern array means is operative in response to pattern control signals to provide sequential patterns of illumination spots and said means to mask said image detector means is operative in response to masking control signals to mask said image detector in synchrony with the patterns of illumination spots to receive light in corresponding patterns, and control means is provided which is connected to said pattern array means and to said means to mask said image detector means, said control means operating to provide pattern control signals to said pattern array means and masking control signals to said means to mask said image detector means.

15. The confocal optical imaging system of claim 14 wherein said image detector means provides image output signals from each pattern of light received by said image detector means, said control means including storage means to receive and store said image output signals.

16. The confocal optical imaging system of claim 14 which includes image processing means, said image detector means operating to provide image output signals from each pattern of light received by said image detector means to said image processing means, said image processing means operating to store said image output signals from sequential patterns of illumination spots and to subsequently combine a plurality of said stored image output signals to form a complete image frame.

17. A method for the confocal optical imaging of a specimen under observation which includes rapidly and sequentially projecting multiple complimentary patterns of stationary illumination spots on different image subsets of said specimen, providing each pattern of illumination spots by forming a transmitted stationary light pattern including a plurality of illumination spots by projecting light to a stationary pattern forming unit operative to transmit a stationary pattern of separate light beams while blocking the remaining projected light;

projecting said transmitted stationary pattern of illumination spots simultaneously on said specimen to form a stationary pattern of illumination spots on said specimen, receiving light from said specimen, and confining said received light to light in a pattern conforming to the pattern of transmitted illumination spots while rejecting light beyond said pattern by projecting the light received from said specimen to a pattern forming unit operative to transmit a pattern of separate light beams conforming to said transmitted light pattern while blocking the remaining light received from said specimen.

18. The method of claim 17 which includes projecting the light received from said specimen to the same pattern forming unit used to form said transmitted light pattern.

19. The method of claim 18 wherein said pattern forming unit is a light gate having a two dimensional array of pixels wherein individual pixels can be switched between a first and a second state to either block or transmit a pixel of light.

20. The method of claim 17 which includes rapidly projecting said sequential complimentary patterns of transmitted illumination spots on image subsets of said specimen until an entire object field has been illuminated, receiving light from said specimen from each of said sequential complimentary patterns and in synchrony with said sequential complimentary patterns, confining said received light to the pattern of a corresponding complimentary pattern of transmitted illumination spots, creating image signals from said received light, and storing said image signals.

21. The method of claim 20 which includes combining the stored image signals once an entire object field has been illuminated by complimentary patterns of illumination spots to form a complete image frame.

22. A method for the confocal optical imaging of a specimen under observation which includes sequentially projecting complimentary patterns of illumination spots on image subsets of said specimen until an entire object field has been illuminated, each pattern of illumination spots being projected simultaneously on said specimen, forming each of said complimentary patterns of illumination spots by projecting light into a light gate having a two-dimensional array of pixels wherein individual pixels can be switched between a first and a second state to either block or transmit a pixel of light to said specimen, receiving light from said specimen from each of said sequential complimentary patterns and in synchrony with said sequential complimentary patterns, confining said received light to the pattern of a corresponding complimentary pattern of projected illumination spots while rejecting light beyond said corresponding complimentary pattern, creating image signals from said received light, storing said image signals, and combining the stored image signals once an entire object field has been illuminated by complimentary patterns of illumination spots to form a complete image frame.

* * * * *